(12) United States Patent
Fernandez (10) Patent No.: US 7,359,846 B1
(45) Date of Patent: Apr. 15, 2008

(54) MODELING AN ASIC BASED ON STATIC PIPELINE DELAYS

(75) Inventor: Jean-Michel Fernandez, Paris (FR)

(73) Assignee: Cadence Design Systems, Inc., San Jose, CA (US)

( * ) Notice: Subject to any disclaimer, the term of this patent is extended or adjusted under 35 U.S.C. 154(b) by 594 days.

(21) Appl. No.: 10/313,597

(22) Filed: Dec. 5, 2002

(51) Int. Cl.
*G06G 7/62* (2006.01)
*G06F 17/50* (2006.01)
*H03K 19/00* (2006.01)

(52) U.S. Cl. .............................. 703/13; 716/6; 716/17
(58) Field of Classification Search ................... 703/13; 716/6, 17
See application file for complete search history.

(56) References Cited

U.S. PATENT DOCUMENTS 5,133,069 A * 7/1992 Asato et al. ................. 713/401
6,230,114 B1 * 5/2001 Hellestrand et al. .......... 703/13

OTHER PUBLICATIONS

Geyong Min and Ould-Khaoua, A Queueing Model For Pipelined Circuit-Switched Networks With The MMPP Traffic, Aug. 15, 2001-Aug. 18, 2001, Proceedings of Ninth International Symposium on Modeling, Analysis and Simulation of Computer and Telecommunication Systems, pp. 259-266.*

Patterson, David A., et al., "Computer Architecture A Quantitative Approach", 2nd Ed., 1996, pp. 125-370, Morgan Kaufmann Publishers, Inc., San Francisco, CA.

Brunel, Jean-Yves et al, "COSY: a methodology for system design based on reusable hardware & software IP's", Technologies for the Information Society, Developments and Opportunities, J.-Y. Roger et al., (Eds.), 1998, pp. 709-716, IOS Press.

Dubey, Pradeep K., et al., "Analytical Modeling of Multithreaded Pipeline Performance", Proceeding of the Twenty-Seventh Annual Hawaii International Conference on System Sciences, 1994, pp. 361-367.

* cited by examiner

*Primary Examiner*—Paul Rodriguez
*Assistant Examiner*—Juan Carlos Ochoa
(74) *Attorney, Agent, or Firm*—Bingham McCutchen LLP (57) ABSTRACT

A simulator for a design of an electronic system includes high-level delay models for architecture resources such as ASICs, CPUs, and busses, for example. The delay models of pipelined ASICs compute static pipeline delays which are then implemented by the system simulator. The ASIC delay models are generic, dynamic, incremental and not intrusive.

33 Claims, 8 Drawing Sheets

MODELING AN ASIC BASED ON STATIC PIPELINE DELAYS

BACKGROUND OF THE INVENTION

Today's embedded system applications, such as multimedia, telecommunication, and automotive applications, are made of a mix of software (SW) and hardware (HW) components. These mixed HW/SW applications need to be simulated to verify their functionality and predict their performance before implementing them.

A simulated system is composed of a functional description and an architectural, or platform, description that implements the functionality. The functional description is generally composed of a network of concurrent tasks connected by communication arcs. Each task or process is written in a high-level language such as C, C++, or SystemC code. Along with this functional description, system designers also have to satisfy a set of performance constraints. To satisfy the system performance constraints, which may be found in high performance data processing systems, critical processes are implemented as HW blocks, such as application specific integrated circuits (ASICs) or Coprocessors. Moreover, to reach the desired performance level, the ASICs are pipelined. One of the major trends in system design simulation is to provide models to simulate the performance of a complete application at the highest level of abstraction. The problem here is to find a good trade-off between the accuracy of the simulation results and the processing time it takes to complete the simulation. Unfortunately, simulating a complex application with a good accuracy (cycle true, bit true) by using low-level simulation models, such as RTL models for ASICs, or ISS for CPUs, usually takes too long to really help designers to explore different solutions or debug their application.

To accelerate the simulation time, one solution is to replace the low-level simulation models by their equivalent high-level system models, which have the same functional behavior and equivalent performance behavior but which execute 10 to 100 times faster or more. Some abstract models for each architectural component of a hardware platform have already been developed, mostly for CPUs and DSPs (i.e. compile code on a virtual CPU architecture) or for non-pipelined ASICs (i.e. model latency from inputs to outputs). These models accelerate the simulation. However, none so far is precise enough to model the performance behavior of pipelined ASICs, because based on estimates or on statistic measures.

For example, two conventional approaches may be used to model the performance behavior of an ASIC. First, if the system designer does not have access to an RTL model of his ASIC, he just can compile and run his code on a computer processing system and guess what the delays could be for the ASIC. Second, if the user does have access to the RTL code, which is usually VHDL, Verilog with static timing constraints, or HDL simulation test-bench, he could run HDL simulations using an RTL simulation tool and extract delays by performing statistics on the simulated measurements. However, designers who use these ASIC delay modeling techniques may face several drawbacks: the delay models may not exist, they may be static, they may be specific, or they may not provide accurate measurements.

If the ASIC model does not exist, then the only solution for the system designer is to guess the delay numbers for this ASIC. If the ASIC model exists, then the RTL simulation results can be statically back annotated in a higher model. However, the results rely on a set of low level benchmark simulation tests which can not be exhaustive. Moreover they depend on one application and therefore they are not generic. The delay models may also be too specific. For example, some dynamic statistical models can be deduced from the RTL simulation results (e.g. linear regressions on look-up tables), but such models are usually inaccurate because they are based on specific simulation runs. Furthermore, the delay models may not be accurate enough. The delay models for ASICs usually model delays between inputs and outputs (latency), but do not model the output rate for each output, or throughput. The throughput is a key component of ASIC delays when the ASIC is pipelined. The throughput is very dependent on the ASIC environment, which includes factors such as input rate out and output blocking phenomena, and therefore can hardly be defined by simulating the ASIC in isolation. For example, using an average throughput for a pipeline ASIC can result in a small estimation error at the output of the ASIC; but when propagating this error through all the components of the system, it can lead to an important global estimation error. A quantification of this error is application dependant and thus no general numbers can be given by conventional approaches.

SUMMARY OF THE INVENTION

A method of modeling delays of a pipelined application specific integrated circuit (ASIC) during a simulation of an electronic system includes determining instantaneous delays, such as throughput and latency for example, based on each input arrival time and on pipeline structural parameters such as the number of stages and the number of multi cycles per stage.

DETAILED DESCRIPTION

An abstract delay model is used to determine the delays in a pipelined ASIC. The abstract delay model is implemented in a system simulator engine and considers system performance constraints to provide accurate results within an efficient run time for the simulation. In one embodiment of the delay model, a network of functional processes, such as Kahn Process Network for example, are mapped onto the pipelined ASIC. Each functional process, which may be written in high level software language, such as C or C++ or SystemC for example, is represented in the simulation by a functional model. The HW pipelined characteristics of the ASIC, such as the number of stages in its pipeline, or the number of multi-cycles per operator, for example, are included in the model. The processes communicate with each other using a predefined communication protocol, such as Blocking read and Non Blocking Write, or Blocking Read and Blocking Write, for example. The functional processes of the ASIC model can have n inputs and m outputs with n>=1 and m>=1.

To ease design reuse and exploration, the delay models of the components of the system, and in particular the ASICs models, may respect certain constraints. For example, the models may be generic, so that the defined delays are not specific to a particular application. The models may dynamically compute delays on the fly as the simulation runs. The delays may not be annotated in the functional code, but rather may be separated from the functional model. Also, the delays may be separated from an architecture implementation to let a designer reuse the ASIC model in another platform.

Figure 1:
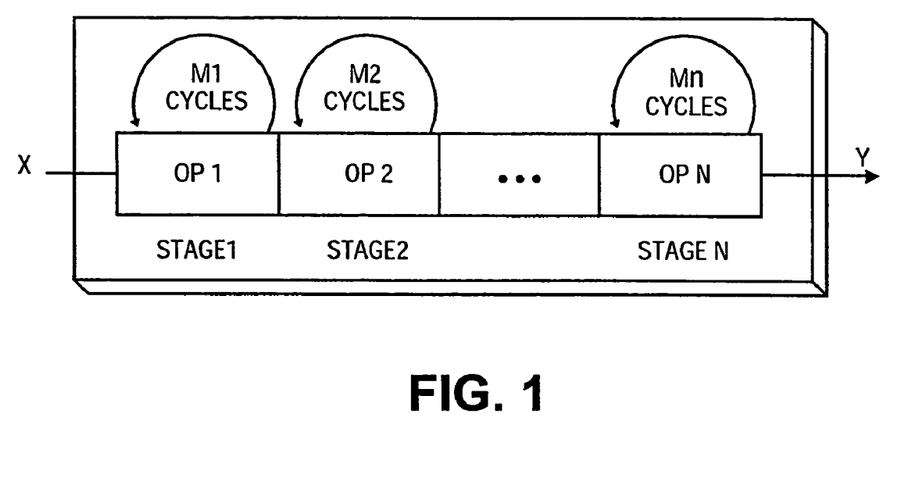
FIG. 1 shows an example of a static pipeline that has delays which can be determined by the delay models of the present invention.

Pipelining an ASIC is an implementation technique that improves the throughput of a function by executing multiple operations in parallel. A static pipeline is a pipeline that has one operator per stage. It can be characterized with the couple $(N, M_1)$, where N is the number of stages in the pipeline, and $M_i$ represents that the operator for stage i takes $M_i$ cycles to perform its operation, where i=1 to N. Other parameters, such as a clock parameter (e.g., CPS: number of cycles per second) may be added to this couple if more precision is desired. An example of a model for a static pipeline in an ASIC is shown in FIG. 1. The sequence of operators in the pipeline is static because the sequence is not data dependent, and the sequence of operators does not change with each new input or after each stage. A DCT (Discrete Cosinus Transform), which is used in image processing applications, is an example of a function that is implemented in the ASIC as a static sequence of operators, or a static pipeline.

A pipeline delay can be defined by its latency, its machine cycle, and its stalls. A latency L (a.k.a. response time) is the amount of time between the start and the completion of a sequence of operations on an input. A machine cycle C (a.k.a. operating time) is the amount of time between the generation of two outputs of the pipeline. A throughput T (a.k.a. operating rate) is the inverse of the machine cycle and is computed as T=CPS/C. A stall S, which is induced by hazards, is the amount of time that the pipeline has to wait to continue processing because of internal or external conditions.

Pipeline stalls can be decomposed into structural stalls, input stalls, output stalls, and waw stalls. A structural stall Sstruct, which is due to structural hazards, is the number of cycles that the pipeline has to wait until the previous stage has completed its operation. An input stall Sinput, which is due to input hazards, is the number of cycles that the pipeline has to wait until next input arrives. An output stall Soutput is caused by output hazards and is the number of cycles that the pipeline has to wait to produce its output because the next resource (e.g. a bus) is not ready to accept the output data. A waw stall Swaw is a Write After Write time stall and is the number of cycles that the pipeline has to wait to produce its output in order to respect the input sequence order.

In static pipelines, the sequence of operators is fixed (not data dependant). Therefore, delays that are independent of the pipeline input values can be computed. A pipeline delay can be characterized by a triplet (C, L, S) defined as a function or algorithm of the pipeline's structural parameters $(N,M_1)$ and the latest input arrival time $tx_k$. The triplet (C, L, S) is the delay function of $(N, M_1, tx_k)$, where C is the number of machine cycles of the pipeline, L is the latency, S represents the stalls, N is the number of stages for the pipeline, M is the number of cycles per operator, $x_k$ is the $k^{th}$ input value of the pipeline, and $tx_k$ is the arrival time of input $x_k$ in the pipeline.

The delay function includes intrinsic and instantaneous delays. The intrinsic delays may be distinguished from the instantaneous delays. The intrinsic delay functions include an intrinsic latency and an intrinsic machine cycle, where:

$$\text{Intrinsic Latency: } L = \Sigma M_1 \ \forall i=1 \ldots N \qquad (1)$$

$$\text{Intrinsic Machine cycle: } C = \max M_1 \ \forall i=1 \ldots N \qquad (2)$$

The instantaneous delays can be computed for each input $x_k$ and may depend on the previous input's arrival time $(tx_{k-1})$. The instantaneous delay functions for input $x_k$ include an instantaneous machine cycle, an instantaneous latency, structural stalls, and input stalls, where $$\text{Instantaneous Machine cycle: } C_k = \max (C, C + Sinput_k - L_k) \qquad (3)$$

$$\text{Instantaneous Latency: } L_k = L + Sstruct_k \qquad (4)$$

$$\text{Structural Stalls: } Sstruct_k = \max(Sstruct_{k-1} - Sinput_k + C, 0) \qquad (5)$$

$$\text{Input Stalls: } Sinput_k = tx_k - tx_{k-1} \text{ with } tx_0 = 0 \qquad (6)$$

The structural and input stalls are used to determine delays that are independent of input values. Output stalls and waw stalls are considered in calculations for blocking delays.

Figure 2:
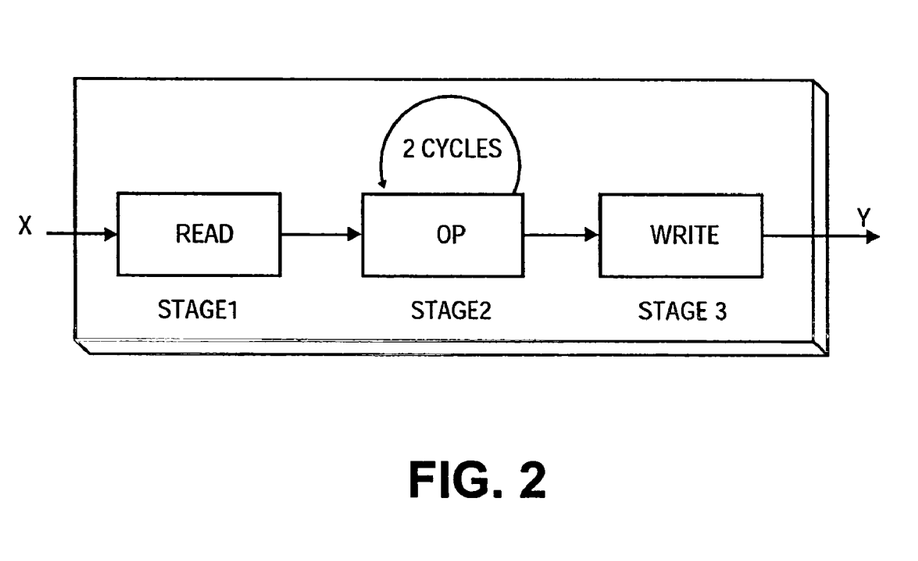
FIG. 2 shows another example of a static pipeline that has delays which can be determined by the delay models of the present invention.

An example of a model of an ASIC with a static pipeline to which the delay calculations may be applied is shown in FIG. 2. The pipeline implements the function y=f(x), where y=x+3. This function is static, and is not data dependent, because the sequence of operations is always the same (read, increment, write) regardless of the input value that is read. In this example, the following pipeline constraints are defined. The pipeline stalls on input x, and the maximum input rate is 1 per cycle, but the input rate is not constant, i.e. inputs do not necessarily arrive at each cycle. This pipeline has N equal to three stages, one operator per stage, the multi cycle of stage one, $M_1$, is one, $M_2$ is two, and $M_3$ is one.

Figure 3:
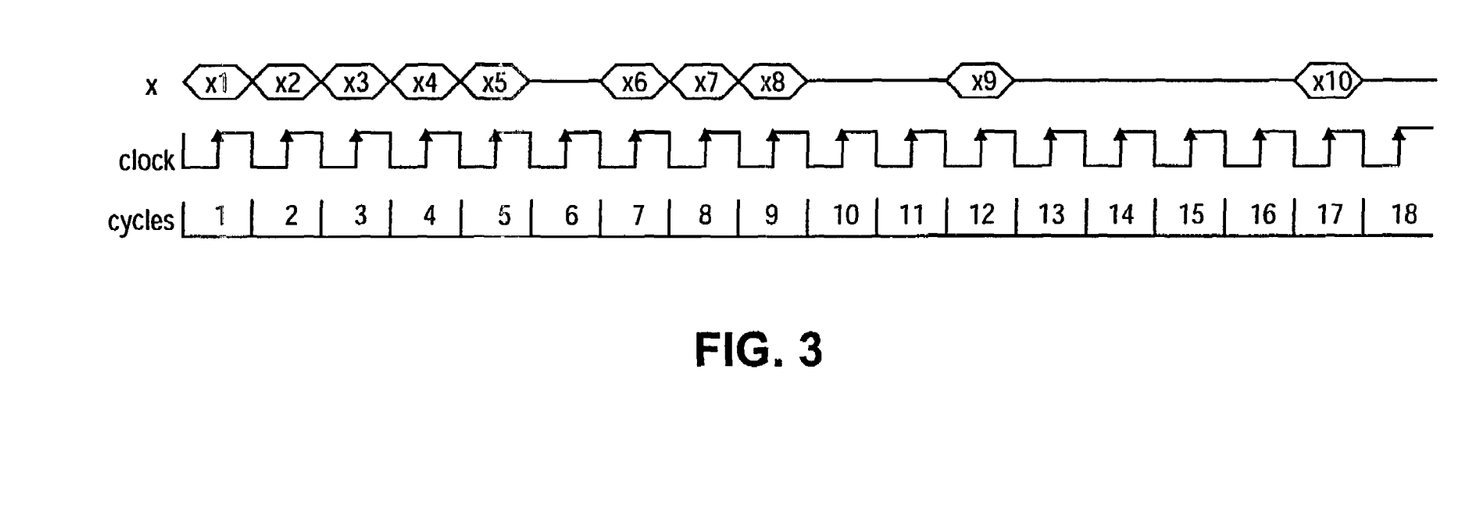
FIG. 3 shows an example of a set of input values that are input to the static pipeline shown in FIG. 2.

The initial values of the delay functions are $C_1=0$; $L_1=L$; $Sstruct_1=0$; $Sinput_1=tx_1$. The operators of the pipeline shown in FIG. 2 include a read operator at stage 1, an incremental (OP) operator at stage 2, and a write operator at stage 3. The read function reads the input value x, and takes one cycle to perform its task. The OP operator performs the incremental function x=x+3 in two clock cycles. The write operation writes the output value of y=x in one clock cycle. An example of a sequence of values x that are input to the ASIC of FIG. 2 is shown in FIG. 3. Each input value x1 through x10 arrives at the input to the ASIC at a time tx, which may be measured by counting cycles of a clock signal as shown in FIG. 3.

Figure 4:
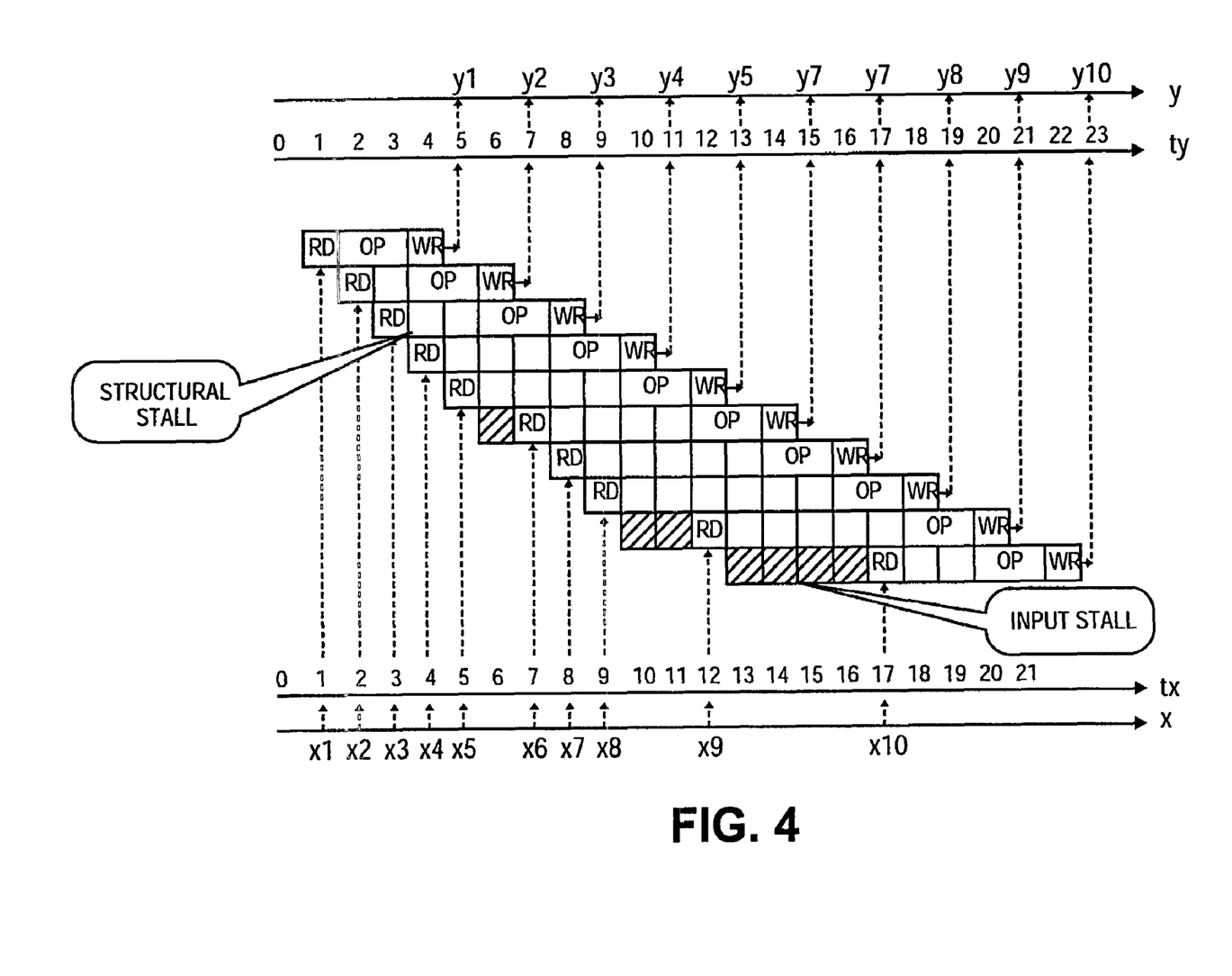
FIG. 4 shows an example of the output response time of the static pipeline of FIG. 2 based on the input sequence of FIG. 3 determined by the delay models of the present invention.

The pipeline's behavior, including the response time of y, to the input sequence of FIG. 3 is shown in FIG. 4. Once the pipeline is full (i.e. starting cycle 5), an output response is written every two cycles. Read operations are performed in the RD boxes, the input is incremented in the OP boxes, and write operations are performed in the WR boxes. Delays due to structural stalls are represented by the empty boxes. The structural stalls cause the input values in the pipeline to wait until the operator OP is free to be processed. Input stalls, which occur when no input value is received at the input to the pipeline, are represented by the hashed boxes. The times tx and ty are given in cycles. Applying the delay equations (1) through (6) to this example, the intrinsic Latency is: $L = Sum\ M_1 = 4$
the intrinsic Machine Cycle is: $C = Max\ M_1 = 2$ and for each input $x_k$,
the instantaneous Machine cycle is: $C_k = 2$
the instantaneous Latency is: $L_k = L + Sstruct_k$ with:
$Sstruct_k = \max(Sstruct_{k-1} - Sinput_k + C, 0)$
$Sinput_k = tx_k - tx_{k-1}$ and
$Sinput_1 = 0$ and $Sstruct_1 = 0$.

In this example, $C_k = ty_k - ty_{k-1} = 2 = C \forall k = 2 \ldots 10$;
but when $Sinput_k > L_k$, then $ty_k - ty_{k-1} = C_k > C$.

The pipeline delay model may be used in an event driven-system simulator. The simulator may be blocking its inputs. If so, then the formulas (1) through (6) may be simplified. For example, to compute Sinput, it is enough to store the current simulation time (Tnow) when a new input arrives, and to store the time the previous input arrived (Tprev). This gives: $Sinput = tx_k - tx_{k-1} = Tnow - Tprev$. There is no need to compute Soutput, because the output is dependant on the external environment of the ASIC; i.e. whether the write is blocking or non blocking.

Using an example of a processing function with one input x and one output y, where y is an arithmetic function of x, a simple modeling of the function implemented on a pipeline ASIC is shown in pseudo code as:

```
Functional model: (pseudo code)
While (true) {
            Read (x);/* process waits until input x arrives */
            y = arithmetic_function (x);
            Write(y);
}
Delay model: (pseudo code)
While (true) {
            Read(x);
            Tprec = Tnow; Tnow = current_time;
            Execute arithmetic function;
            Compute latency and machineCycle;
            Write (y) after delay(latency);
}
```

This delay model has several characteristics. Read and write operations in this model can be performed during the same cycle, and a write operation may occur even when no input is read. For this delay model, the latency and machine-cycle are computed and used to determine the after behavior of an event. For example, the after behavior of an event such as a write operation may include delaying the performance of the write operation until a certain time in the future.

Figure 5:
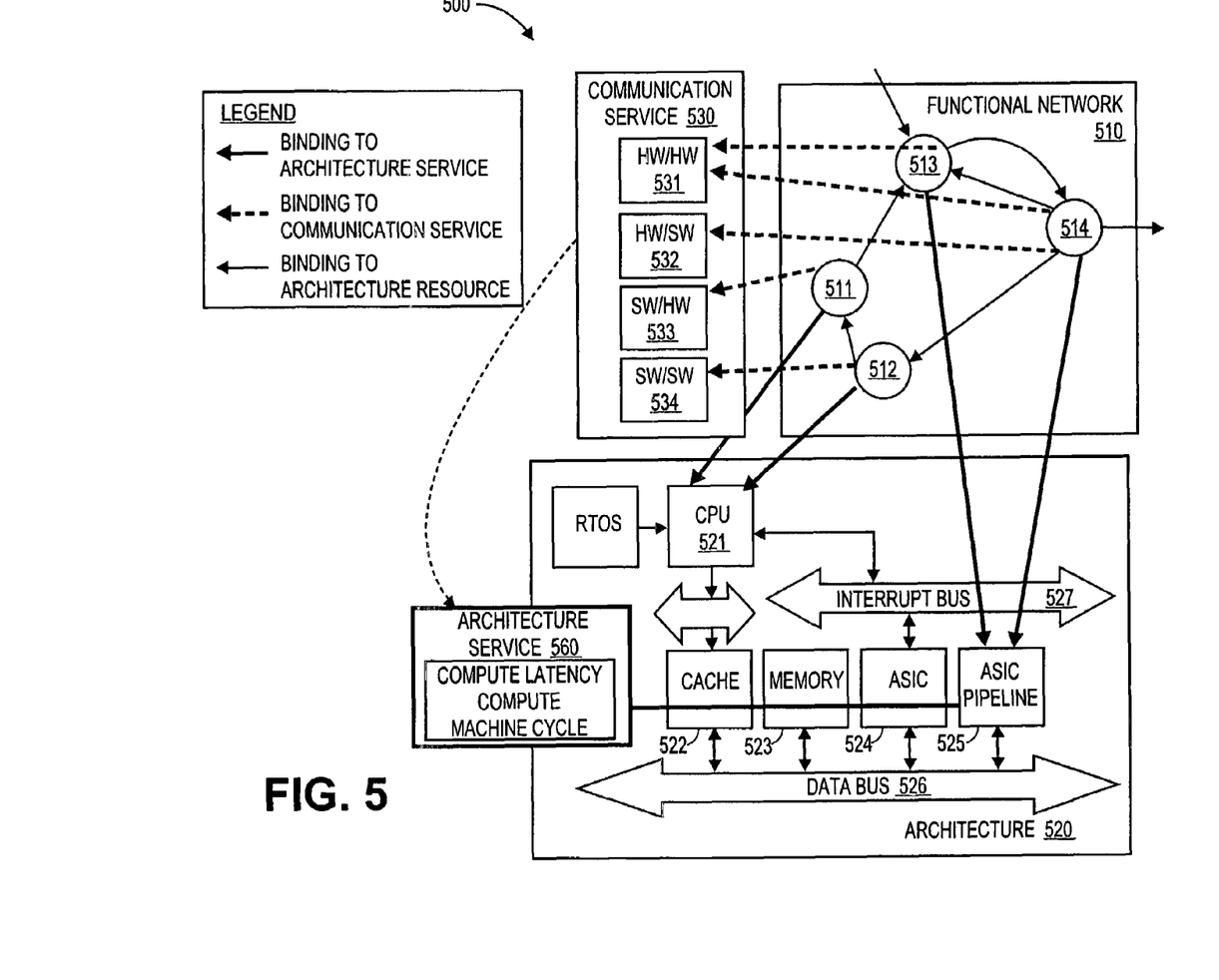
FIG. 5 shows an example of a model of a system that includes a communication service and an architecture service to implement the delay models of the present invention.

An embodiment of this delay model, with these characteristics, may be implemented in a system simulator to provide accurate calculations for the ASIC delays, as shown in FIG. 5. The simulator includes a model of a functional network 510 that models functions with functional blocks 511, 512, 513, and 514. An architecture model 520 is used to model the hardware components of the system. For example, the hardware component models may include a CPU 521, a cache memory 522, a system memory 523, an ASIC 524, and a pipelined ASIC 525. The model may also have buses, such as data bus 526 and interrupt bus 527.

An architecture service 560 may be used to compute the latency for each output of a functional block mapped on the pipeline 525. The architecture service may be implemented as a software object, such as a C++ object for example. The architecture service 560 is attached to one or more architecture resources of architecture 520. For each instance of the architecture resource, there is an instance of the architecture service. With each architecture service is an architecture service interface (such as a C++ header file for example), which defines the API of the architecture service. The object may include some public methods that can be called by other objects or other services. The delay values may be determined using methods to compute the latency and to compute the machine-cycle. For example, the architecture service may compute the pipeline delays by executing the ASIC pipeline delay functions of equations (1) through (6). These functions take the ASIC pipeline structural parameters (N, M) as their input values and return respectively the latency and machine-cycle of the pipeline of the ASIC.

The communication service may be used to implement the overload of a functional write of a process that is mapped to an ASIC. The communication service 530 may be a software object, such as a C++ object for example, and is attached to each port of a functional block in functional network 510, as shown in FIG. 5. The communication service defines the type of the communication between two ports of two functional blocks, from output to input. This communication can be one of SW to SW when, for example, two blocks are mapped as software tasks to a CPU, as shown by block 534. The communication may be SW to HW when, for example, the sender is mapped as software tasks to a CPU and the receiver is mapped as hardware on ASIC resource, as shown by block 533. The communication may also be HW to SW, or HW to HW, as shown by blocks 532 and 531 respectively.

The HW to HW and HW to SW communications may be considered in the delay model, because the write side (sender) may be overloaded to model the pipeline behavior. In addition, each functional block is mapped to an architecture resource (i.e. HW blocks are mapped on an ASIC and SW blocks are mapped to a CPU). For each instance of a functional block, there is one instance of a communication service attached to each output port of the functional block. With the mapping link to the architecture resource, whether a block is a SW or a HW block may be deduced. Therefore, the map of each port to a given architecture resource may be determined. Each time a Write operation is executed in a functional HW block, the corresponding HW to XX communication is invoked in place of the functional Write. The overloaded version of the Write, which is defined in the communication service, takes the same parameters as the functional Write does and can implement any refinement of the write as needed. In this embodiment of a pipeline model, the functional write is overloaded by a new write using the write after method.

Figure 6:
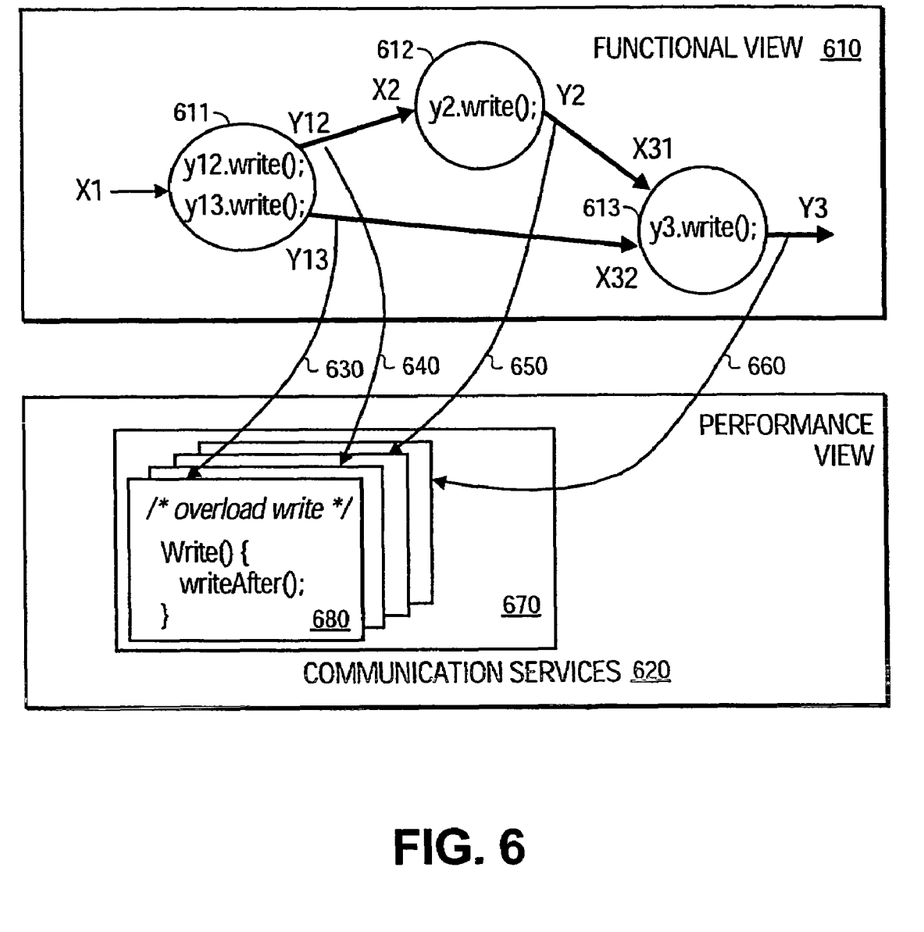
FIG. 6 shows an example of a communication service to overload a functional write by a performance write based on the delay models of the present invention.

FIG. 6 shows an example of communication services 620 overloading functional write events by performance write events 630, 640, 650, and 660 from functions 611, 612, and 613 of functional network 610 to model the delays. The pipeline performance behavior may be modeled by overloading, each write event by a write-after event delayed by the instantaneous latency. For example, the communication service may overload write event 630 by a pipeline write after event (e.g., write after 680). To do this, the communication service sets the pipeline's structural parameters on each functional output port, and calls the architecture service to compute the delays with the appropriate parameters. The computed delay is then sent from the architecture service to the communication service. The write operation for the output 630 is delayed in the future and scheduled to occur after the computed delay time. The outputs 640, 650, and 660 are also overloaded and scheduled to occur after their corresponding delay time. An internal FIFO (First In First Out) 670 may be included to reschedule and store the output values while they are being delayed.

When the current simulation time reaches the time the asynchronous event is scheduled to occur, a callback mechanism is activated. The callback mechanism can be seen as a function that, when called, takes precedence over any other task of the simulator engine, similar to an interruption in a CPU. When the callback function is completed, the simulator returns to its previous context. The system simulator engine may be used to handle the asynchronous events. An example of the write after and the callback functions is given below in C++ pseudo code.

```
// This function is invoked when one output of a functional block posts a message
// It schedules an asynchronous event to occur in the future
void WriteAfter (message)
{
    // compute pipeline instantaneous delays
    latency = ArchitectureService.computeLatency (N,M);
    machineCycle = ArchitectureService.computeMachineCycle (N,M);
    // create a new asynchronous event and attach it delays and data
    asyncEvent = createAsynchronousEvent(message, latency, multiCycle);
    // schedule the write to occur in the future
    schedule (Tnow + latency, asyncEvent); // Tnow is the current time
}
// This function is invoked when the scheduled time arrives.
void callback (asyncEvent)
{
    WriteNow (asyncEvent.message);
}
```

Multiple functional processes and outputs may be mapped to one ASIC resource using communication service. In a system design, one static pipeline may be assigned to one output of a process. Multiple processes may be assigned to the same ASIC. Systems designers may map all the outputs of the same process to the same ASIC. When multiple outputs and/or processes are mapped to the same ASIC, the pipeline corresponding to a given output may be determined by using a unique reference, such as the communication service instance (a unique instance) attached to the process output port.

Figure 7:
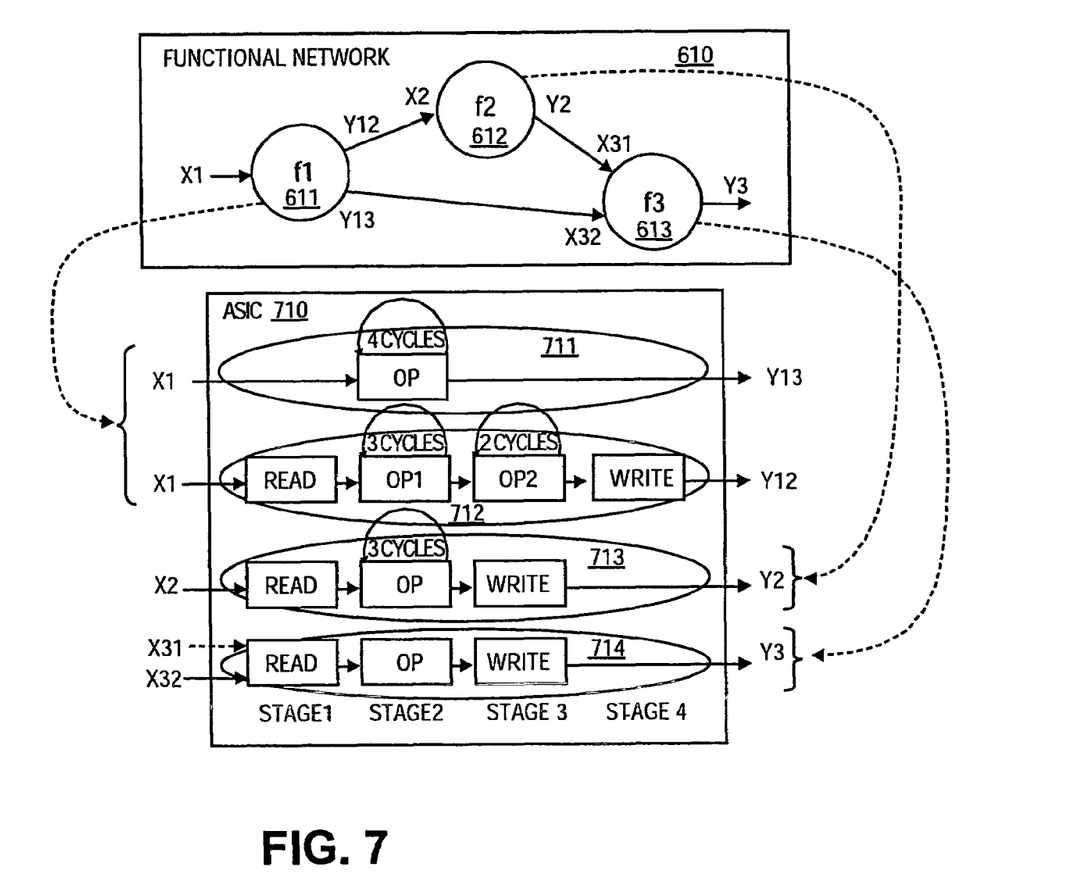
FIG. 7 shows an example of a functional network mapped to an ASIC pipeline structure with four static sub pipelines having three stages each to determine delay values based on the delay models of the present invention.

An ASIC can be seen as a device composed of S static pipelines that can execute in parallel, as illustrated in FIG. 6. Functional network 610 defines three processes. The three processes 611, 612, and 613 may be mapped to pipelined ASIC 710 as shown in FIG. 7. This results in a virtual ASIC architecture made of S sub pipelines, with S=Sum of Outputs of processes, which is four in this example. As shown in FIG. 7, the process f1, with outputs y12 and y13, is mapped to the first two sub pipelines 711 and 712. The process f2, with output y2, is mapped to the third sub pipeline 713. The process f3, with output y3, is mapped to the fourth sub pipeline 714. Each sub pipeline can have a different number of stages and a different number of multi-cycles per stage. It can also be composed of a single stage. If so, then the output, which is a map to this single-stage-pipeline, may not be pipelined.

In one embodiment of system networks, functional processes are synchronous, so that each output value is produced after all of the corresponding input values have arrived. Therefore the outputs of each function, and not the inputs, may be considered to model the pipeline delays. Consequently, pipeline structural parameters are defined on the functional output ports. Since each output is mapped to a specific pipeline, one place to set pipeline parameters (N, Mi) is on the communication service, because it is attached to each output port. Because the function is executed in an event driven simulator, the output will only be written when all its inputs have arrived. Therefore it is enough to only consider the latest arrival time of all the inputs of the function (a.k.a. functional fanin of an output) to compute the output instantaneous delays. The instantaneous delay functions of the pipeline apply for functions with multiple inputs by replacing $t_{xk}$ by Latest_Arrival_Time (functional_fanin $(y_k)$). In the example shown in FIG. 7, the latency between inputs x31 and x32 and the output y3 can be modeled as:

$$\text{Latency } (y3) = \text{Write\_Time } (y3) - \text{Latest\_Arrival\_Time} \\ (\text{functional\_fanin}(y3)) \quad (7)$$

The pipeline model may be refined to handle an external environment. The pipeline delay model discussed above works properly when considering the ASIC in isolation. But in real systems, the ASIC is connected to an external environment that includes other resources, such as a bus, a CPU, and memory devices for example. Therefore the effects of the external environment of the ASIC may be considered in the delay model to improve the accuracy of the delay models. For example, the external environment may cause a non blocking write or a blocking write to occur on the output of the ASIC.

Figure 8:
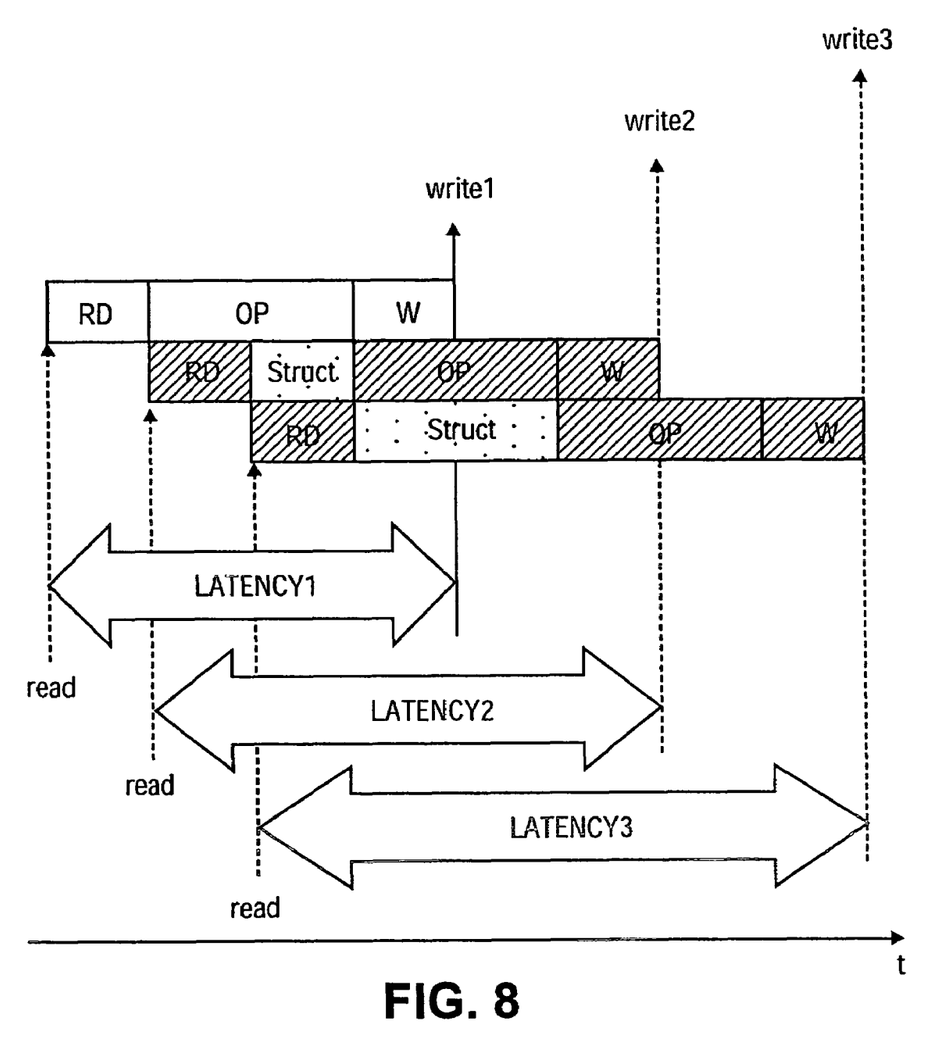
FIG. 8 shows an example of delays that produce non-blocking write times determined by the delay models of the present invention.

A non blocking write occurs when the pipeline in the ASIC always writes its data on a bus and the bus is always free. The bus has enough bandwidth to accept all write requests from the ASIC. An example of a non blocking write is presented in FIG. 8. For the non blocking example of FIG. 8, the corresponding static pipeline has three stages: one stage to read data (RD), one stage to process data (OP), and one stage to write data (WR). The number of multi-cycles of the read and write stages is one cycle. The OP stage takes two cycles. A structural stall is introduced to cause the pipeline to delay performing operations until the OP stage has completed its operation and is able to receive a new input. The write events occur when their corresponding latency ends. As shown in FIG. 8, none of the write events is blocking. For this case, there is no need to add extra delays to the pipeline latency delay model, because each write will never block and therefore will not introduce any additional delay to the model.

A more realistic situation is that several resources share the bus. In this case, it is likely that the bus may be busy when the ASIC pipeline writes to it. For example, the bus may be transmitting data for another resource when the ASIC attempts to write. In order to avoid losing data, the pipeline has to block, or stall, its operations until the bus is available. This blocking phenomenon introduces wait delays that are added to the delay model.

Figure 9:
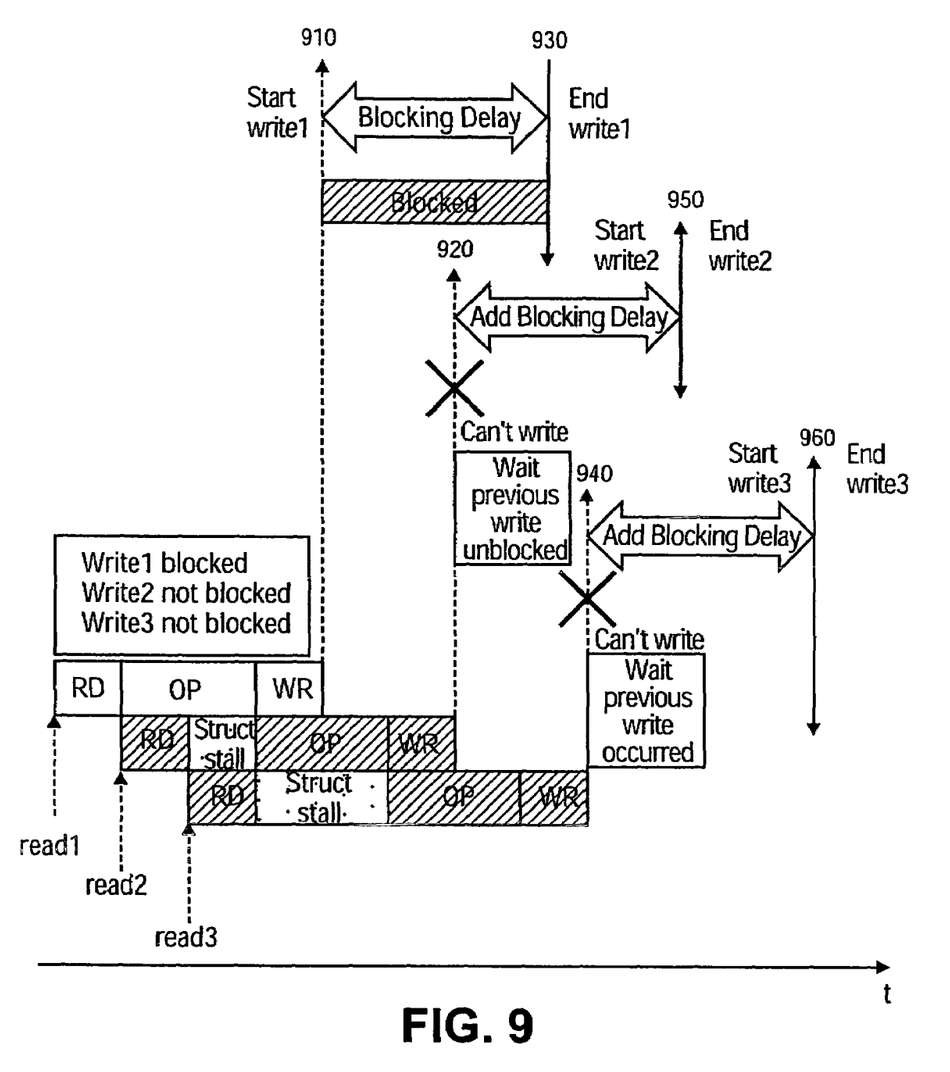
FIG. 9 shows an example of delays that produce blocking write times that are processed by the delay models of the present invention.

An example of blocking is presented in FIG. 9, where the corresponding pipeline is a three stage static pipeline with RD, OP, and WR operational stages. The first write operation, write 1, starts blocking when the pipeline starts write 1, and blocks until the pipeline ends write 1. The blocking delay is therefore equal to the length of time between start write 1 and end write 1. The other two write operations, write 2 and write 3, are not blocking.

FIG. 9 shows several blocking situations. One situation is a blocking delay. The first write starts at the initially computed delay time 910, which is the latency, but ends after the initial delay time plus a blocking delay time, at time 930. The second write operation is originally scheduled to occur when the first write operation is blocked, at time 920. The second write operation is prevented from occurring because the bus is blocked at time 920.

Another situation is a write after write delay. The second write is immediate (non-blocking), and can be performed whenever the bus is not blocked, such as time 930. However, in order for the output sequence of the pipeline to respect the input sequence, the second write waits until after the previous write completes its operation before performing the second write, so that write 2 occurs after write 1. Therefore, the blocking delay is added to the original delay of write 2 to generate a waw (write after write) delay. The second write occurs at time 950 which is after time 920. Writing the two events at the same time is avoided, and values are output in a sequence that follows the input sequence. The waw delay time is expressed as:

WAW Delay Time=Blocking Delay+Intrinsic
machine cycle Delay          (8)

The third write also has a waw delay, even though it does not have a blocking delay. The third write is scheduled to occur after the blocking time, at time 940, and therefore could be executed at its initially scheduled time. However, this would cause the third write to occur before the second write. The third write is rescheduled to occur at time 960, in order to prevent write 3 from occurring before write 2. Therefore, the waw order is respected. The waw delay for write 3 is equal to the initial delay of write 3 plus the blocking delay. In this example, the third write is immediate (not blocking).

When a write is blocking the output, and the pipeline is full, the pipeline stalls (i.e. it can not read more inputs) and therefore the pipeline may also block on the read side to avoid losing data. To include these situations in the delay model, the model determines whether a previous write is blocked. To check this state of the write, a Boolean flag (e.g., noEventIsScheduled) is set to false before the write and reset to true after the write. Any other event (such as a new write) occurring during the blocking period is rescheduled to occur after the blocking time.

Since the blocking delay is computed when the first write gets unblocked, all events that arrive during the blocking period are stored in a buffer, which reschedules the outputs on a first in first out (FIFO) basis. When the first write has completed, the first event of the FIFO is popped and is rescheduled to occur at a time that considers the length of the blocking delay. This solves both the blocking problem (an event that occurs when the process is blocked on its write) and the waw problem (an event that occurs out of sequence when the process is not blocked on its write) by scheduling one asynchronous event at a time. A new schedule starts when the previous write has completed.

A value for the blocking delay may not need to be determined. Instead, the intrinsic machineCycle delay is computed, and the pending write event is scheduled to occur at Tnow+machineCycle (i.e. after the previous write has completed plus the machine cycle time). Determining whether the pipeline is full and blocking may be performed by comparing the size of the rescheduling FIFO to the number of stages N of the pipeline. When the number of values in the rescheduling FIFO equals the number of stages N, the process is suspended to stop reading inputs (i.e. the pipeline stalls). The process is released from suspension when the current write has completed. With these principles, the delay equations (1) through (6) may be modified to include blocking write delays. An example of a modification is shown using pseudo C++ code as follows:

```
// This function is invoked when a (write) event arrives.
// This event is asynchronous (because of the WriteAfter implementation).
void WriteAfter (message)
{
//compute pipeline delays
latency = ArchitectureService.computeLatency (N, M);
machineCycle = ArchitectureService.computeMachineCycle (N, M);
//create a new asynchronous event and attach it delays and data
asyncEvent = createAsynchronousEvent (message, latency, multi-cycle);
// Schedule the write after the computed latency
if( noEventIsScheduled) {
    // no other event is currently scheduled: schedule this one
    noEventIsScheduled = false;
    // Flag will be reset when write completes in callback function
    schedule (Tnow + latency, asyncEvent); // Tnow is the current time
}else {
    //previous write is blocked: store this event in the
    rescheduleFIFO
    // It will be treated when the previous write has completed
    if(rescheduleFIFO.size( ) > N)
        suspend_process( ); //pipeline stalls: block the process
    //push the first pending event in the FIFO
    rescheduleFIFO.push ( asyncEvent);
}
}
// This function is invoked when the scheduled time arrives.
void callback (asyncEvent)
{
    WriteNow (asyncEvent.message);
    // after Write has completed . . .
    if ( rescheduleFIFO.empty( )) {
        // . . . no event is pending: free access for another write
        noEventIsScheduled = true;
    }else {
        // . . . pop the first pending event from the FIFO and reschedule
        it
        pendingAsyncEvent = rescheduleFIFO.pop( );
        machineCycle = pendingAsyncEvent.machineCycle;
        noEventIsSeheduled = false;
        schedule (Tnow + machineCycle, pendingAsyncEvent);
        resumeprocess( );
    }
}
```

This implementation of a delay model prevents data loss during blocking delays by storing data in a buffer (such as the rescheduling FIFO) for the asynchronous events scheduled to occur during a blocking write. This enhanced delay model works whether the write is blocking or not blocking.

A model for static pipelines and an implementation that can be used in a system simlulator has been described. The model may be implemented in a system that has both hardware and software components. For example, the model may be used for an MPEG2 decoder design using HW/HW and HW/SW communication services. The delay model supports blocking or non-blocking write communications. The delay model may not require any change in a functional model. Also, this model allows a separation of the functional model from the performance model and a separation of the functional model from the architecture implementation.

The delay model may include features that are desired by system designers. For example, the model may support any functional description language (such as C, C++, or SystemC, for example). The functional models may remain unchanged (thus allowing intellectual property protection of the functional models). The functional network may not require modification. The mapping and the architecture may remain unchanged. The model may provide good delay modeling of a pipeline effect, because it models latency and throughput using an asynchronous event mechanism. The model provides a good separation of roles. The functional model may be separated from the architecture, so that there is no intrusive architecture assumption in the functional code. The delay model may be separated from the functional model using the architecture service. Also, the pipeline parameters may defined externally, on communication services for example.

Pipeline delays may be computed at run time rather than statically defined by the user before run time. The same generic code may be used to model pipelined and non-pipelined outputs of the ASIC. The pipeline model may work for any expected method of computation, including blocking read, blocking write and blocking read, non-blocking write. An asynchronous event mechanism that does not change the scheduling of the tasks may be used. Also, this model supports processes with multiple inputs and outputs by providing one pipeline per output.

The invention claimed is:

1. A method of modeling delays of a pipelined application specific integrated circuit (ASIC) during a simulation of an electronic system, comprising:
   determining an intrinsic delay model for a pipeline of the ASIC based on intrinsic delay functions for any sequence of input values, wherein the intrinsic delay functions comprise structural parameters;
   determining an instantaneous delay model for each input value based on instantaneous delay functions, wherein the instantaneous delay functions comprise the difference between the arrival time of the input value and the arrival time of the previous input value; and
   modeling a delay of the pipelined ASIC based on the determined intrinsic delay model and the determined instantaneous delay model.

2. The method of claim 1, further comprising:
   performing a read operation for each input value;
   performing one or more functional operations for each input value to determine a corresponding output value;
   determining a delay period for each output value based on the intrinsic and the instantaneous delay models; and
   performing a write operation for each output value based on the delay period.

3. The method of claim 2, wherein performing a write operation for each output value based on the delay period comprises:
   scheduling a time to perform the write operation in the future based on the delay period; and
   performing the write operation at the scheduled time.

4. The method of claim 1 wherein each input value contains a number of stages N of input values, and the instantaneous delay model for at least one of the input values comprises one or more of an instantaneous machine cycle, an instantaneous latency, a structural stall, and an input stall.

5. The method of claim 4, wherein the instantaneous machine cycle of a $k^{th}$ input value, for each k from 1 to N, comprises:
   $C_k = \max(C, C + Sinput_k - L_k)$;
   where $C_k$ is the instantaneous machine cycle of the $k^{th}$ input value, C is an intrinsic machine cycle, $Sinput_k$ is the input stall of the $k^{th}$ input value, and $L_k$ is the intrinsic latency of the $k^{th}$ input value.

6. The method of claim 4, wherein the instantaneous latency of a $k^{th}$ input value, for each k from 1 to N, comprises:
   $L_k = L + Sstruct_k$;
   where $L_k$ is the instantaneous latency of the $k^{th}$ input value, L is an intrinsic latency, and $Sstruct_k$ is the structural stall of the $k^{th}$ input value.

7. The method of claim 4, wherein the structural stall of a $k^{th}$ input value, for each k from 1 to N, comprises:
   $Sstruck_k = \max(Sstruct_{k-1} - Sinput_k + C, 0)$;
   where $Sstruck_k$ is the structural delay of the $k^{th}$ input value, $Sstruct_{k-1}$ is the structural delay of the previous input value, $Sinput_k$ is the input stall of the $k^{th}$ input value, and C is an intrinsic machine cycle.

8. The method of claim 4, wherein the input stall of a $k^{th}$ input value, for each k from 1 to N, comprises:
   $Sinput_k = tx_k - tx_{k-1}$
   where $Sinput_k$ is the input stall of the $k^{th}$ input value, $tx_k$ is an arrival time of the $k^{th}$ input value, and $tx_{k-1}$ is an arrival time of the previous input value.

9. The method of claim 3, wherein the instantaneous delay model further comprises a blocking delay.

10. The method of claim 9, wherein performing a write operation for each output value based on the delay period further comprises:
    storing the output value in a buffer;
    rescheduling a time for the write operation of the output value based on the blocking delay; and
    performing the write operation at the scheduled time.

11. The method of claim 1, further comprising:
    overloading a functional write by a performance write;
    using a communication service to invoke an architecture service; and
    computing the pipeline structural and instantaneous delays with the architectural service.

12. An article of manufacture comprising a computer readable medium storing instructions which, when executed by a processing system, cause the processing system to perform a method of modeling delays of a pipelined application specific integrated circuit (ASIC) during a simulation of an electronic system, the method comprising:
    determining an intrinsic delay model for a pipeline of the ASIC based on intrinsic delay functions for any sequence of input values, wherein the intrinsic delay functions comprise structural parameters;
    determining an instantaneous delay model for each input value based on instantaneous delay functions, wherein the instantaneous delay functions comprise the difference between the arrival time of the input value and the arrival time of the previous input value; and
    modeling a delay of the pipelined ASIC based on the determined intrinsic delay model and the determined instantaneous delay model.

13. The article of claim 12, wherein the instructions, when executed, cause the processing system to perform the method further comprising:

performing a read operation for each input value;
performing one or more functional operations for each input value to determine a corresponding output value;
determining a delay period for each output value based on the intrinsic and the instantaneous delay models; and
performing a write operation for each output value based on the delay period.

14. The article of claim 13, wherein the instructions, when executed, cause the processing system to perform a write operation for each output value based on the delay period by:
scheduling a time to perform the write operation in the future based on the delay period; and
performing the write operation at the scheduled time.

15. The article of claim 12 wherein each input value contains a number of stages N of input values, and the instantaneous delay model for at least one of the input values comprises one or more of an instantaneous machine cycle, an instantaneous latency, a structural stall, and an input stall.

16. The article of claim 15, wherein the instantaneous machine cycle of a $k^{th}$ input value, for each k from 1 to N, comprises:
$C_k = \max(C, C+Sinput_k - L_k)$;
where $C_k$ is the instantaneous machine cycle of the $k^{th}$ input value, C is an intrinsic machine cycle, $Sinput_k$ is the input stall of the $k^{th}$ input value, and $L_k$ is the intrinsic latency of the $k^{th}$ input value.

17. The article of claim 15, wherein the instantaneous latency of a $k^{th}$ input value, for each k from 1 to N, comprises:
$L_k = L + Sstruct_k$;
where $L_k$ is the instantaneous latency of the $k^{th}$ input value, L is an intrinsic latency, and $Sstruct_k$ is the structural stall of the $k^{th}$ input value.

18. The article of claim 15, wherein the structural stall of a $k^{th}$ input value, for each k from 1 to N, comprises:
$Sstruck_k = \max(Sstruct_{k-1} - Sinput_k + C, 0)$;
where $Sstruck_k$ is the structural delay of the $k^{th}$ input value, $Sstruct_{k-1}$ is the structural delay of the previous input value, $Sinput_k$ is the input stall of the $k^{th}$ input value, and C is an intrinsic machine cycle.

19. The article of claim 15, wherein the input stall of a $k^{th}$ input value, for each k from 1 to N, comprises:
$Sinput_k = tx_k - tx_{k-1}$
where $Sinput_k$ is the input stall of the $k^{th}$ input value, $tx_k$ is an arrival time of the $k^{th}$ input value, and $tx_{k-1}$ is an arrival time of the previous input value.

20. The article of claim 14, wherein the instantaneous delay model further comprises a blocking delay.

21. The article of claim 20, wherein the instructions, when executed, cause the processing system to perform a write operation for each output value based on the delay period by:
storing the output value in a buffer;
rescheduling a time for the write operation of the output value based on the blocking delay; and
performing the write operation at the scheduled time.

22. The article of claim 12, wherein the instructions, when executed, cause the processing system to perform the method further comprising:
overloading a functional write by a performance write;
using a communication service to invoke an architecture service; and
computing the pipeline structural and instantaneous delays with the architectural service.

23. An apparatus for modeling delays of a pipelined application specific integrated circuit (ASIC) during a simulation of an electronic system, comprising:

means for determining an intrinsic delay model for a pipeline of the ASIC based on intrinsic delay functions for any sequence of input values, wherein the intrinsic delay functions comprise structural parameters;
means for determining an instantaneous delay model for each input value based on instantaneous delay functions, wherein the instantaneous delay functions comprise the difference between the arrival time of the input value and the arrival time of the previous input value; and
means for modeling a delay of the pipelined ASIC based on the determined intrinsic delay model and the determined instantaneous delay model.

24. The apparatus of claim 23, further comprising:
means for performing a read operation for each input value;
means for performing one or more functional operations for each input value to determine a corresponding output value;
means for determining a delay period for each output value based on the intrinsic and the instantaneous delay models; and
means for performing a write operation for each output value based on the delay period.

25. The apparatus of claim 24, wherein said means for performing a write operation for each output value based on the delay period comprises:
means for scheduling a time to perform the write operation in the future based on the delay period; and
means for performing the write operation at the scheduled time.

26. The apparatus of claim 23 wherein each input value contains a number of stages N of input values, and the instantaneous delay model for at least one of the input values comprises one or more of an instantaneous machine cycle, an instantaneous latency, a structural stall, and an input stall.

27. The apparatus of claim 26, wherein the instantaneous machine cycle of a $k^{th}$ input value, for each k from 1 to N, comprises:
$C_k = \max(C, C+Sinput_k - L_k)$;
where $C_k$ is the instantaneous machine cycle of the $k^{th}$ input value, C is an intrinsic machine cycle, $Sinput_k$ is the input stall of the $k^{th}$ input value, and $L_k$ is the intrinsic latency of the $k^{th}$ input value.

28. The apparatus of claim 26, wherein the instantaneous latency of a $k^{th}$ input value, for each k from 1 to N, comprises:
$L_k = L + Sstruct_k$;
where $L_k$ is the instantaneous latency of the $k^{th}$ input value, L is an intrinsic latency, and $Sstruct_k$ is the structural stall of the $k^{th}$ input value.

29. The apparatus of claim 26, wherein the structural stall of a $k^{th}$ input value, for each k from 1 to N, comprises:
$Sstruck_k = \max(Sstruct_{k-1} - Sinput_k + C, 0)$;
where $Sstruck_k$ is the structural delay of the $k^{th}$ input value, $Sstruct_{k-1}$ is the structural delay of the previous input value, $Sinput_k$ is the input stall of the $k^{th}$ input value, and C is an intrinsic machine cycle.

30. The apparatus of claim 26, wherein the input stall of a $k^{th}$ input value, for each k from 1 to N, comprises:
$Sinput_k = tx_k - tx_{k-1}$
where $Sinput_k$ is the input stall of the $k^{th}$ input value, $tx_k$ is an arrival time of the $k^{th}$ input value, and $tx_{k-1}$ is an arrival time of the previous input value.

31. The apparatus of claim 25, wherein the instantaneous delay model further comprises a blocking delay.

32. The apparatus of claim 31, wherein said means for performing a write operation for each output value based on the delay period further comprises:
   means for storing the output value in a buffer;
   means for rescheduling a time for the write operation of the output value based on the blocking delay; and
   means for performing the write operation at the scheduled time.

33. The apparatus of claim 23 further comprising:
   means for overloading a functional write by a performance write;
   means for using a communication service to invoke an architecture service; and
   means for computing the pipeline structural and instantaneous delays with the architectural service.

* * * * *